L. P. McCHESNEY.
HOT WATER HEATING SYSTEM.
APPLICATION FILED JAN. 12, 1917.

1,364,772.

Patented Jan. 4, 1921.
3 SHEETS—SHEET 1.

L. P. McChesney,
Inventor

By Geo. P. Kimmel,
Attorney

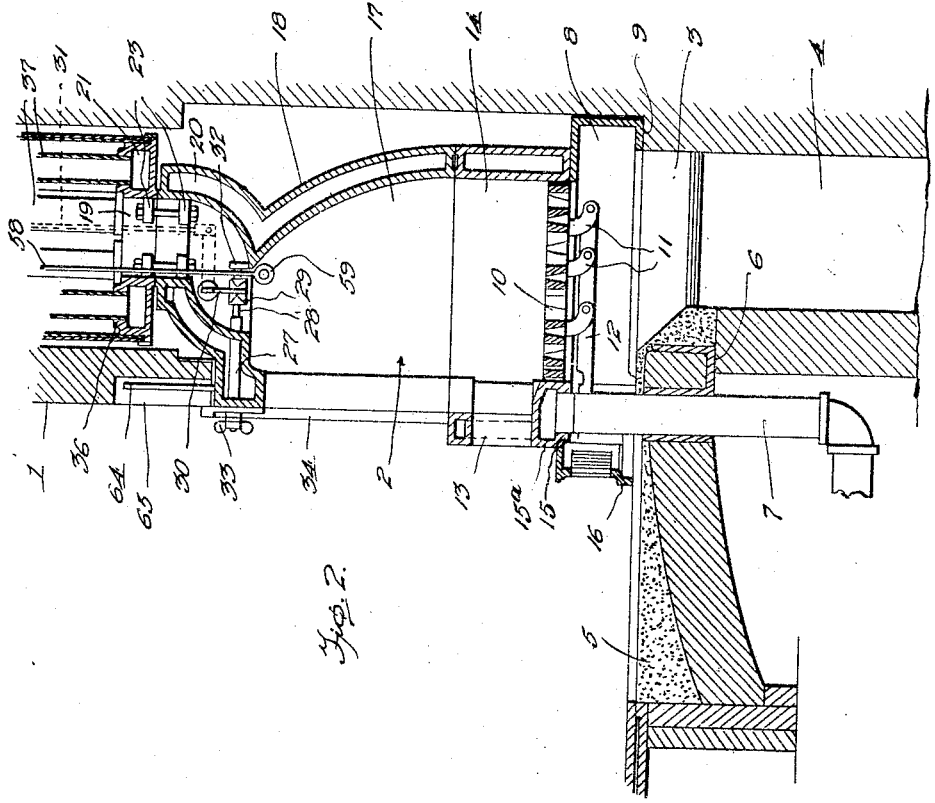

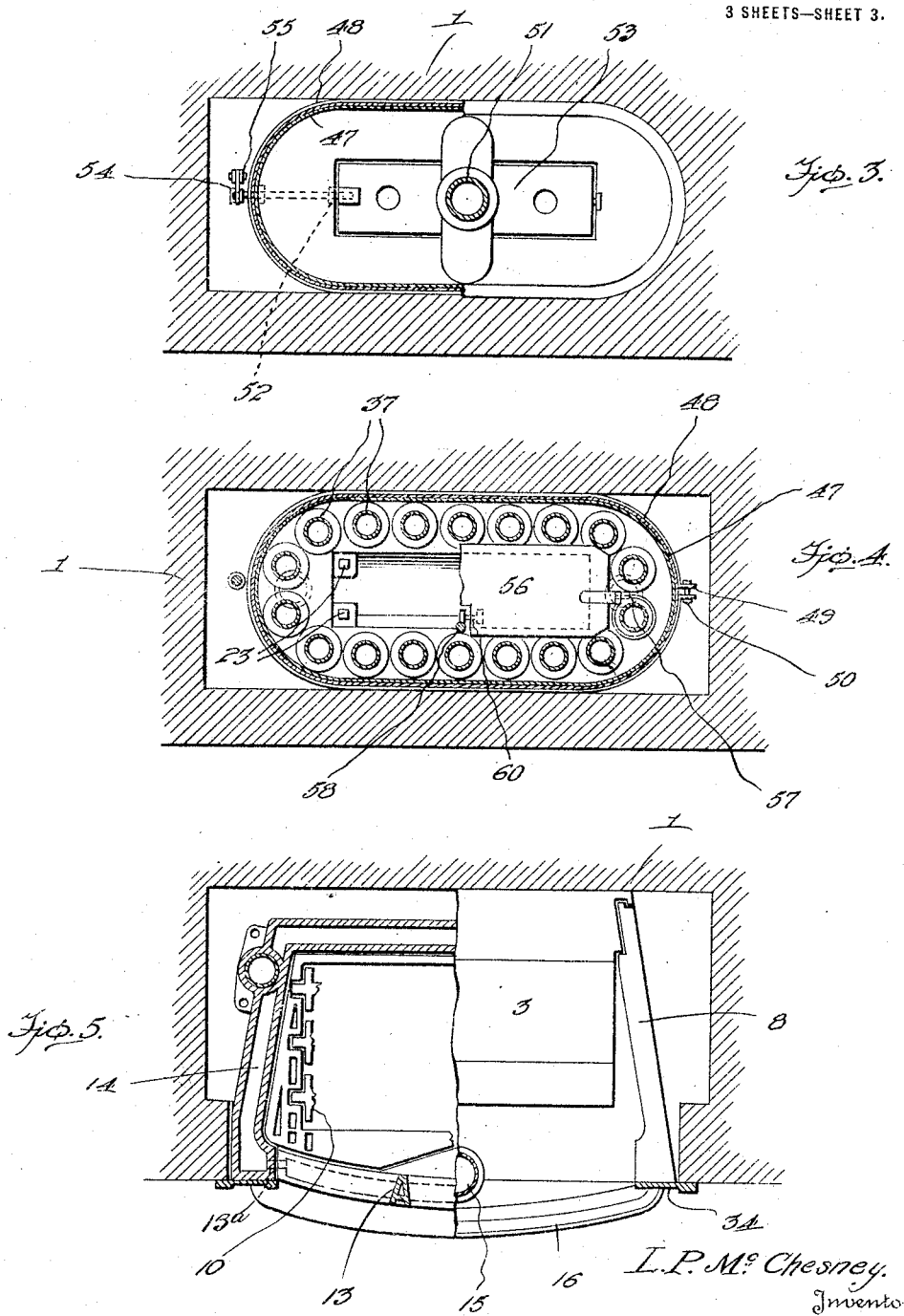

UNITED STATES PATENT OFFICE.

LOUIS P. McCHESNEY, OF EL PASO, TEXAS.

HOT-WATER HEATING SYSTEM.

1,364,772.          Specification of Letters Patent.          Patented Jan. 4, 1921.

Application filed January 12, 1917. Serial No. 141,994.

*To all whom it may concern:*

Be it known that I, LOUIS P. MCCHESNEY, a citizen of the United States, and resident of El Paso, in the county of El Paso and State of Texas, have invented certain new and useful Improvements in Hot-Water Heating Systems, of which the following is a specification.

The present invention relates, generally, to heating devices; and the invention has more especial reference to an improved hot water heating open fire place.

The invention has for its principal object to provide a novel hot water heating system for use in buildings, particularly, homes and like places where it is desirable to add to the attractiveness of the same; the means for heating the water for distribution through the radiating system, comprising the usual form of open fire-place, thus, permitting the fire place to not only heat the place in proximity thereof, but also, to transmit, through the medium of the water, heat of sufficient tensity as will maintain an even and uniform temperature in rooms distant therefrom.

Another object of the invention and one of equal importance, is to provide an open fire place and boiler for heating the water preparatory to its circulation through the radiating system, composed of sections, thereby permitting the installation of the same in the ordinary fire-place without alterations to the brickwork thereof.

Other objects relate to considerations of economy of production, durability in use, and convenience in installation, maintenance and operation of the several mechanisms or parts entering into the construction of elements and the above defined general organization of said elements.

Other improvements and novel details in the construction and arrangement of the various parts of the device will be brought out more in detail in the description to follow, which for a clear understanding of the invention, should be considered in connection with the accompanying drawings, forming a part thereof, and wherein is disclosed for the purpose of illustration, convenient and satisfactory embodiments of the invention.

In the drawings:

Fig. 2 is a vertical longitudinal section through the fire-place and a fragment of one of the boilers;

Fig. 3 is a transverse section taken on the line 3—3 of Fig. 1;

Fig. 4 is a similar section taken on the line 4—4 of Fig. 1;

Fig. 5 is a transverse section taken on the line 5—5 of Fig. 1; and

Fig. 6 is a fragmental detail partly in section showing the mounting of the deflecting dampers within the boiler sections.

Figure 1:
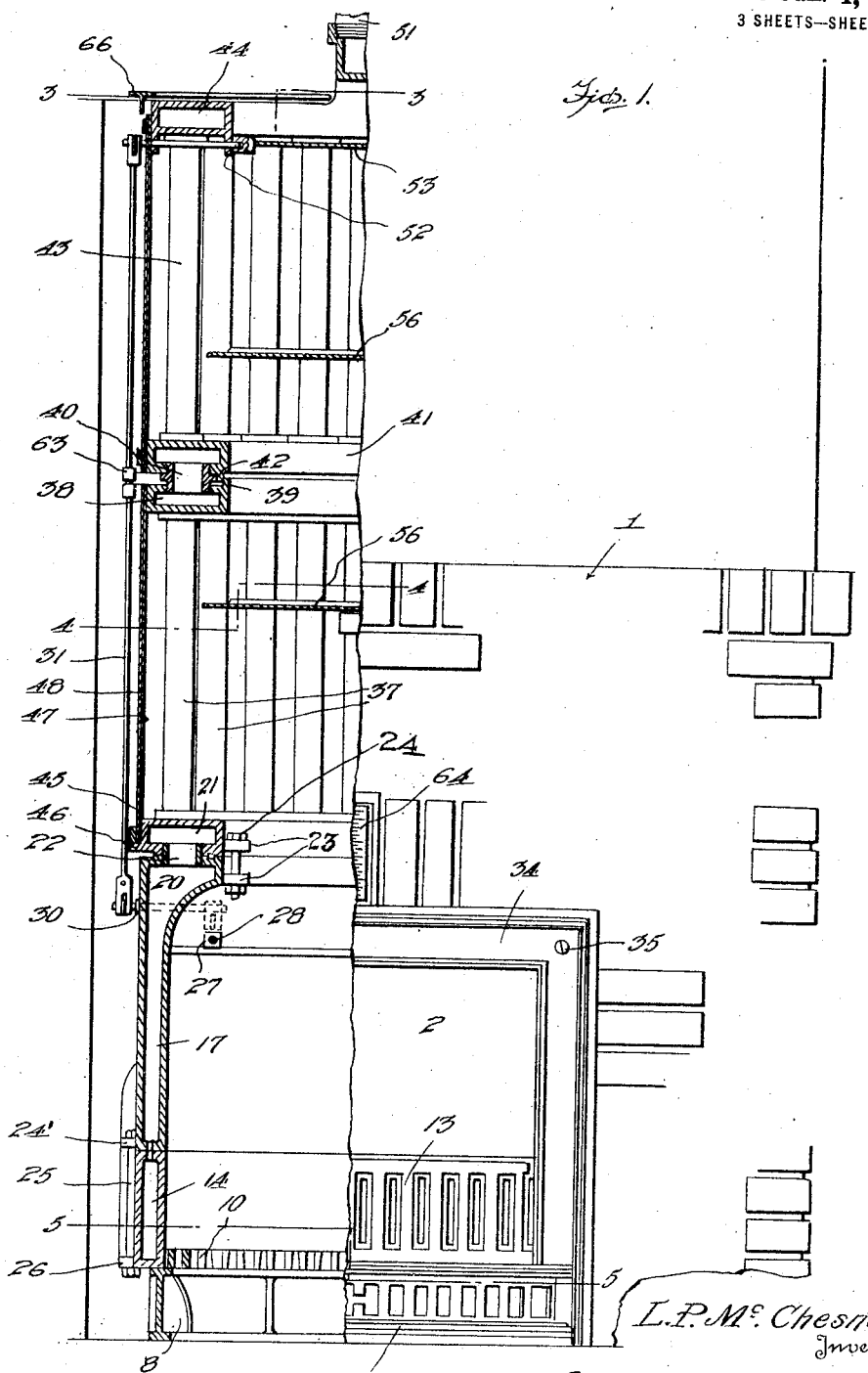
Figure 1 is a front elevation of the improved fire-place, parts thereof being broken away and shown in section to illustrate the arrangement of the boiler section.

Referring now more particularly to the drawings, wherein like reference characters designate corresponding parts throughout the several views thereof, my improved construction may be stated to embody the usual chimney breast, indicated in its entirety by the numeral 1, the said breast being composed of brick or other similar decorative material. An opening is formed within the lower portion of the breast 1 and constitutes the fire receiving chamber or what is commonly called an open fire-place. The open fire-place is designated for the purpose of convenience, by the numeral 2. Beneath the fire-place 2 a receptacle 3 is arranged and provides for means whereby the ashes from the fire may be dumped downwardly into the ash pit 4 arranged therebeneath. A hearth 5 comprising a suitable sub-base which base is covered with the desired plastering material is arranged forwardly of the fire-place 2, thus, lending to the attractiveness of the same, and also, as will be obvious, increasing the efficiency thereof. To properly support the stub-base of the hearth 5 a channel beam 6 is provided and has one portion thereof resting upon the upper or top edge of the outer wall of the ash pit 4. An opening is formed vertically of the hearth 5 and receives therethrough a water circulating pipe 7, the said pipe extending for a distance above the hearth into the fire-place 2 and serving as a return inlet for the water.

The fire-box of the fire-place 2 comprises a base 8, the said base being formed of angle metal, the lower portion of the rear extremity thereof being seated upon a shoulder 9 as formed within the rear wall of the fire-place 2, while the forward portion of the said base is received upon the hearth 5. A grate 10 is supported upon the base and is provided with depending arms 11, which arms, in turn, are pivotally connected to a shaker bar 12, the bar extending to a point convenient to the user, whereby the grate may be shaken to free the same of ashes and the like. A front grate 13 is arranged at the front of the fire-place 2 and is connected to the fire-box section 14, the said section being double walled in order that a suitable water jacket may be had, thus, permitting the circulation of the water to be heated therethrough. It will be also noted, that the bars of the front grate 13 are made hollow and communicate with the double wall construction of the section 14 by passages 13$^a$, thereby, permitting the circulation of water through the same also. The lower terminals of the vertical front grate bars communicate directly with the front lower portion 15$^a$ of the fire box section 14. A nipple 15 is formed integral with the forward portion of the section 14 in proximity of the front grate 13 thereof and is adapted to receive through an opening therein the upper extremity of the water return inlet pipe 7. To regulate the draft upwardly through the grate 10, a damper 16 is arranged in front of the base 8 of the fire-place and has formed therein a series of openings, which openings may be closed through the medium of a slidable closure plate, also providing similar openings, these openings being adapted to aline at times with the openings as formed in the damper 16. To facilitate sliding of the closure plate of the damper 16, a knob or other suitable handle may be and preferably is formed upon the same and projects forwardly of the damper. As will be noted, the section 14 when properly positioned upon the base 8, rests upon the horizontal plane portion thereof, while connection with the circulating inlet pipe 7 will serve as means for preventing undue lateral shifting thereof.

A second section 17, having a reversely curved rear wall 18 is arranged upon the upper or top edge of the section 14 and serves as means for completing the fire-box of the fire-place 2. The section 17 is also formed with double or spaced walls and is provided with suitable openings in the upper and lower marginal edges thereof, whereby communication will be established between the same and the section 14, whereupon, the water will be passed onto additional heating means, the construction of which will be hereinafter more fully described. A draft opening 19 is formed within the upper portion of the section 17 and communicates with the flue of the chimney 1, thereby insuring proper draft through the fire-place 2. The forward or front extremity of the section 17 is enlarged to provide a semi-annular chamber 20, over which there is placed an annular water circulating drum 21, the said drum being connected to the chamber 20 by means of a plurality of slip nipples 22, which are slid into engagement with complemental openings formed within the bottom wall of the chamber 20 and the drum 21. An opening is arranged concentrically of the annular drum 21 and is of a size and shape complemental to the opening as formed within the top of the section 17. Apertured lugs 23 are arranged upon the walls of the said concentric opening and also upon the walls of the opening 19 as formed within the section 17 and receive therethrough connecting bolts 24, thus, permitting, a firm uniting of the section 17 and the water drum 21. To secure the section 17 to its supporting section 14, apertured ears 24' are formed upon the lower outer portions thereof and receive therethrough connecting bolts 25, the lower extremities of the said bolts passing through similar ears 26 as formed upon the lower portion of the section 14, whereat, they are secured by turning locking nuts or the like into engagement with the threaded extremities thereof. As a means for controlling the draft damper in the flue of the chimney breast 1, whereby, to efficiently regulate the draft in the fire-place 2, there is slidably arranged within a horizontally disposed tube 27 as carried by the forward portion of the section 17, a rotatable rod 28. The inner and outer extremities of the rotatable rod 28 are screw threaded, the inner extremity thereof having turned into engagement therewith a nut 29, which receives therethrough the lower extremity of a crank arm 30 rotatably mounted within the opening 19 and having its outer extremity pivotally connected to a vertically depending pull rod 31, the said rod extending upwardly into the chimney breast 2 and is connected to a suitable draft controlling damper which will be subsequently described. To support the inner end of the rotatable rod 28, a bearing 32 is formed upon the adjacent portion of the section 17 and loosely receives the same. A wing nut 33 is engaged with the outer threaded extremity of the rod 28, and, obviously, by rotating the same, the nut 29 as arranged upon the inner extremity of the rod 28 will be moved either forwardly or backwardly, depending upon the direction in which the said rod is rotated. Thus, the crank arm 30 will be rocked, and by means of its pivotal connection with the rod 31 will impart a reciprocatory movement thereto. To add to the appearance of the fire-place and to cover the joint between the chimney breast and the lower portion of the section 17, a facing strip 34 is arranged about the said forward portion of the section 17 and overlaps the adjacent portion of the brickwork of the chimney breast.

Bolts 35 may be passed through the facing strip 34 into engagement with the forward portion of the section 17, thereby, providing for means to secure the said facing strip in position.

In the upper portion or wall of the annular drum 21, there is formed a plurality of screw threaded openings 36, which receive therein, water circulating pipes generally designated by the numeral 37, the said pipes extending upwardly into the flue of the chimney breast for a distance, whereat, they have their upper ends which are engaged with a second or annular water drum 38 by welding or the like, the said drum being constructed similar to the drum 21 and having arranged adjacent the concentric opening therein, an annular flange 39. Openings are also formed within the upper wall of the drum 38 and have turned into engagement therewith screw couplings 40, or more specifically, oppositely threaded nipples, the upper portions of the said nipples being turned into engagement with the superposed annular water drum 41, which drum also, has formed adjacent the concentric opening therein an annular flange 42, so positioned as to allow the flange 39 of the water drum 38 to overlap the same and consequently, provide a sufficient jointure for the two drums. It will be readily understood, that with the plurality of pipes 37, which pipes communicate with the water drums 21 and 38, respectively, I have obtained an efficient boiler section, which section will serve as means for causing the further heating of the water and passage therethrough, inasmuch, as such heat as may be directed from the fire-place 2 into the flue of the chimney breast will contact with the outer surface of the pipes 37 and also with the upper water drum 38. A plurality of other water pipes 43 are provided, the said pipes communicating with the drum 38 by way of suitable openings formed in the top portions thereof, while upon the upper extremity of the pipes 43, and communicating therewith, is yet another water drum 44, this drum being provided with openings in the bottom thereof for receiving the adjacent extremities of the pipe 43 thereinto. To prevent the contact of heat with the side wall of the chimney breast 2 and to cause the same to be entirely directed onto the various pipes 37 and 43 of the several boiler sections a metal jacket 45 is arranged thereabout having the lower marginal edge resting on a shoulder 46 formed upon the water drum 21. A heat insulating jacket formed of asbestos or the like and indicated by the numeral 47 is arranged about the metal jacket 45 and is secured in proper relation thereto by means of metal bands or straps 48, the opposite extremities of which are alined and offset as at 49 to provide apertured ears through which connecting bolts 50 are passed. By tightening the bolts 50, it is obvious, that the bands 48 may be drawn tightly about the jackets 47 and 48, thus, efficiently connecting the same.

To permit passage of the heated water from the fire-box and boiler sections into the radiating system, there is engaged to the top of the drum 44, a connection 51 through which the water is conducted, the water being finally returned by way of the return pipe 7.

A damper is rotatably mounted adjacent the concentric opening of the annular water drum 44, the bearing pintles thereof being passed through suitable openings formed in the depending annular flange 52 of the said water drum, the damper being indicated by the numeral 53. As is shown in Fig. 1, one of the bearing pintles of the standard 53 extends to a point beyond the casing 48 and carries thereon a right-angularly disposed link 54, the said link having its outer or remaining end pivotally connected to one end of the pull rod 31 as at 55. Thus, by rotating the rod 28 within the bearing tube 27, movement of the damper 53 to open and closed position may be minutely regulated in order that sufficient draft may be directed onto the fire within the fire-place.

With a view toward providing deflecting means whereby the passage of heat directly through the chimney breast 2 into the atmosphere will be baffled, I arrange within the several boiler sections, heat deflecting baffles, indicated by the numeral 56, the said baffles being rotatably supported upon bearing collars 57, secured to certain of the pipes 37 and 43, while in order to operate the same, that is, move the same to open or closed positions whereby the deflection of heat onto the said pipes 37 and 43 may be regulated, I provide a pull rod 58, the lower extremity of which is looped as at 59, in order that it may be readily grasped to permit operation of the deflecting dampers as connected thereto. The rod 58 is composed of a plurality of sections, which sections are pivotally connected to the several deflecting dampers as at 60, thus, permitting the same to properly rotate upon their bearings when a pull or push is imparted to the rod 58. It will be understood, that the baffles 56 are so pivoted as to counter-weight the rod 58, hence, permitting the same to normally lie in closed or deflecting positions. Stop collars 61 are arranged upon certain of the water circulating pipes 37 and 43 and are maintained in adjusted positions by means of set screws 62 which are turned into engagement therewith, and accordingly, bind upon the adjacent portions of the said pipes to which they are attached. By providing the heat deflecting baffles 56, it will be appreciated, that I have also provided means for collecting such soot as may accumulate within the chimney breast 2 and when it is desired to dump the same therefrom, the pull rod 58 is moved so as to cause tilting of the said baffles, consequently, affecting the discharge of the soot or other matter as deposited on the same therefrom.

To permit the ready disassembling of the damper operating rod 31, the same may be and preferably is composed of a plurality of sections, which sections are united by a screw coupling or a union 63. Thus, when the boiler sections have been lowered within the chimney breast 2, the couplings 63 may be readily turned out of engagement with the adjacent screw threaded extremity of the rod 31 and the said rod easily removed.

A thermometer 64 is arranged within a suitable compartment 65 formed in the brickwork of the chimney breast 1 and may extend into engagement with the water jacket of the section 17 to indicate the temperature of the same and enable the proper regulation of the fire upon the grate 10.

As is usual in the construction of chimney flues, that portion of the same as above the upper boiler section of my improved system is lined with a suitable plastic material and to prevent the dropping of crumbled portions thereof downwardly into the fire-place, I embed an angle iron 66 within the side walls of the chimney, the horizontal portions of the said iron presenting an efficient abutment or stop.

It is to be understood, that any number of radiators may be included in the radiating system of my improved construction, such as conditions or preference may dictate, this depending largely upon the size of the fireplace or grate therefor.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. It is also to be understood that the language used in the following claims is intended to cover all of the generic and specific features of the invention herein described and all statements of the scope of the invention, which, as a matter of language, may be said to fall therebetween.

I claim:

1. In combination, an open fire place and flue connected therewith, a plurality of water circulating members arranged in the flue in superposed relation and comprising drums, a plurality of annular series of vertically disposed water pipes connecting several of the drums, jackets supported upon the drums inclosing the water pipes of the several series, the pipe being disposed in uniformly spaced relation to the jackets to provide passages for the products of combustion from the heating means, a baffle pivotally mounted between two diametrically opposed pipes of each annular series of water pipes and movable to a position to obstruct the vertical space between the series of pipes and prevent the passage of the products of combustion through the series of pipes and cause the products of combustion to enter between the pipes and circulate between the latter and the jackets, and means for adjusting the baffles.

2. In combination, an open fire place and flue connected therewith, a plurality of annular water circulating drums arranged in superposed relation in the flue, a plurality of annular series of vertically disposed water pipes connecting the drums, jackets supported above the drums and arranged in spaced relation to the series of water pipes, a deflecting baffle arranged within each series of pipes and movable to a position to obstruct the direct passage of the products of combustion through the series of pipes and cause said products of combustion to enter between the pipes and circulate between the latter and the jacket, and a draft controlling damper arranged in the uppermost drum of a size to fit the interior of the latter to completely control the draft passing through the jackets.

In testimony whereof I affix my signature hereto.

LOUIS P. McCHESNEY.